United States Patent
Brazeau et al.

(10) Patent No.: US 11,520,924 B2
(45) Date of Patent: Dec. 6, 2022

(54) IDENTIFYING THAT AN ITEM OF INFORMATION POTENTIALLY INCLUDES AN ITEM OF SENSITIVE INFORMATION

(71) Applicant: salesforce.com, inc., San Francisco, CA (US)

(72) Inventors: Colin Brazeau, Burlington, MA (US); Joselito Campos Santana, San Francisco, CA (US); Jeremiah David Brazeau, Hudson, NH (US)

(73) Assignee: Salesforce, Inc., San Francisco, CA (US)

( * ) Notice: Subject to any disclaimer, the term of this patent is extended or adjusted under 35 U.S.C. 154(b) by 327 days.

(21) Appl. No.: 16/729,633

(22) Filed: Dec. 30, 2019

(65) Prior Publication Data
US 2021/0200895 A1    Jul. 1, 2021

(51) Int. Cl.
*G06F 21/62* (2013.01)
*G06Q 40/02* (2012.01)
(Continued)

(52) U.S. Cl.
CPC ........ *G06F 21/6245* (2013.01); *G06F 16/248* (2019.01); *G06Q 40/02* (2013.01);
(Continued)

(58) Field of Classification Search
CPC ............. G06F 21/6245; G06F 21/6227; G06F 16/248; G06Q 40/02; G06Q 50/265; H04L 9/3247; H04L 63/102
See application file for complete search history.

(56) References Cited

U.S. PATENT DOCUMENTS 9,147,042 B1 * 9/2015 Haller .................... G06Q 40/08
9,248,973 B1   2/2016 Brazeau
(Continued)

FOREIGN PATENT DOCUMENTS

WO    WO-2015188193 A1    12/2015

OTHER PUBLICATIONS

Wikipedia, "Information Sensitivity", https://en.wikipedia.org/wiki/Information_sensitivity, printed Oct. 23, 2019, 6 pages.
(Continued)

*Primary Examiner* — Khoi V Le
(74) *Attorney, Agent, or Firm* — Butzel Long; Donald J. Lecher

(57) ABSTRACT

A method for identifying that an item of information potentially includes an item of sensitive information can be provided. The item of information can be received in response to a query of an end-user database. An existence of a characteristic associated with the item of information can be determined. The characteristic can be indicative that the item of information potentially includes the item of sensitive information. The characteristic can be different from being that a source of the item of information has been designated, via an information management system, as unsearchable. An action can be caused in response to a determination of the existence of the characteristic. The end-user database can be included in a multi-tenant database. The item of sensitive information can include one or more of classified information, confidential business information, private information, personal information, personal identifiable information, personal identifying information, personally identifiable information, or personally identifying information.

19 Claims, 22 Drawing Sheets

(51) Int. Cl.
  *H04L 9/40* (2022.01)
  *G06F 16/248* (2019.01)
  *H04L 9/32* (2006.01)
  *G06Q 50/26* (2012.01)

(52) U.S. Cl.
  CPC ......... *G06Q 50/265* (2013.01); *H04L 9/3247* (2013.01); *H04L 63/102* (2013.01)

(56) References Cited

U.S. PATENT DOCUMENTS

| | | |
|---|---|---|
| 9,280,153 B1 | 3/2016 | Palamarchuk |
| 9,389,609 B1 | 7/2016 | Mountz |
| 9,440,790 B2 | 9/2016 | Mountz |
| 9,494,934 B2 | 11/2016 | Brazeau |
| 9,604,358 B1 | 3/2017 | Brazeau |
| 9,639,824 B1 | 5/2017 | Brazeau |
| 9,656,806 B2 | 5/2017 | Brazeau |
| 9,663,292 B1 | 5/2017 | Brazeau |
| 9,694,976 B1 | 7/2017 | Wurman |
| 9,758,302 B1 | 9/2017 | Brazeau |
| 9,767,432 B1 | 9/2017 | Brazeau |
| 9,923,966 B1 | 3/2018 | Franklin |
| 9,926,138 B1 | 3/2018 | Brazeau |
| 9,952,589 B1 | 4/2018 | Brazeau |
| 9,961,141 B1 | 5/2018 | Allard |
| 10,048,060 B1 | 8/2018 | Brazeau |
| 10,077,155 B1 | 9/2018 | Mountz |
| 10,144,591 B2 | 12/2018 | Brazeau |
| 10,192,195 B1 | 1/2019 | Brazeau |
| 10,209,711 B1 | 2/2019 | Brazeau |
| 10,223,666 B1 | 3/2019 | Palamarchuk |
| 10,315,231 B1 | 6/2019 | Brazeau |
| 10,322,802 B1 | 6/2019 | Krishnaswamy |
| 10,330,480 B1 | 6/2019 | Krishnaswamy |
| 10,364,099 B1 | 7/2019 | Brazeau |
| 10,379,959 B1 | 8/2019 | Franklin |
| 10,380,380 B1 * | 8/2019 | Abdi Taghi Abad ........................ H04M 3/2281 |
| 10,399,772 B1 | 9/2019 | Brazeau |
| 10,437,895 B2 * | 10/2019 | Chang ................... G06F 16/951 |
| 10,450,138 B1 | 10/2019 | Pikler |
| 10,453,145 B2 | 10/2019 | Lawlor |
| 10,528,061 B2 | 1/2020 | Brazeau |
| 2015/0199540 A1 * | 7/2015 | Abt, Jr. ................... G06F 21/64 726/26 |
| 2018/0082244 A1 | 3/2018 | Brazeau |
| 2018/0285808 A1 | 10/2018 | Swiercz |
| 2020/0334376 A1 * | 10/2020 | Bragdon ............. G06F 21/6245 |
| 2021/0036995 A1 * | 2/2021 | Guo .................... G06F 21/6245 |

OTHER PUBLICATIONS

Wikipedia, "Personal Data", https://en.wikipedia.org/wiki/Personal_data, printed Oct. 23, 2019, 11 pages.

\* cited by examiner

FIG. 5

| Field | Searchable |
|---|---|
| Name | N |
| E-Mail Address | N |
| Credit Card Number | N |
| Title | Y |
| Identification | Y |
| Author | Y |
| Genre | Y |
| Available | Y |

| Self-Help | | |
|---|---|---|
| Get It Together, Man! | A.J. Squaredaway | Self-Help |
| SH-7293 | | 2 |
| The Karma Apple Picker | Dharma Ohm | Self-Help |
| NewAge-73257 | | 7 |
| You're Fine Just the Way You Are | Harmony Song | Self-Help |
| 6835-7600-5498-3802 | | 11 |
| Stop Adult Bedwetting | Holden Itin | Self-Help |
| SH-7438 | | 13 |

| Title | Identification | Author | Genre | Available | Key |
|---|---|---|---|---|---|
| You're Fine Just the Way You Are | 6835-7600-5498-3802 | Harmony Song | Self-Help | 11 | 1 |
| The Karma Apple Picker | NewAge-73257 | Dharma Ohm | Self-Help | 7 | 2 |
| Stop Adult Bedwetting | SH-7438 | Holden Itin | Self-Help | 13 | 3 |
| Get It Together, Man! | SH-7293 | A.J. Squaredaway | Self-Help | 2 | 4 |
| How I Came Out of the Closet | NF8356-92557 | Ellen Echo | Self-Help | 9 | 5 |

| Self-Help | | |
|---|---|---|
| Get It Together, Man! | A.J. Squaredaway | Self-Help |
| SH-7293 | | 2 |
| The Karma Apple Picker | Dharma Ohm | Self-Help |
| NewAge-73257 | | 7 |
| How I Came Out of the Closet | Ellen Echo | Self-Help |
| NF8356-92557 | | 9 |
| You're Fine Just the Way You Are | Harmony Song | Self-Help |
| 6835-7600-5498-3802 | | 11 |

| Key | Name | E-Mail Address | Credit Card Number | Twitter Handle |
|---|---|---|---|---|
| A | Anne Alpha | anne.alpha@gmail.com | 9753-8600-1357-8754 | |
| B | Bill Bravo | bravobill@msn.com | 6830-8563-9745-1268 | @BillBravo |
| C | Cindy Charles | ccharles@yahoo.com | 8659-3563-5632-9636 | |
| D | Dan Delta | deltaforce@hotmail.com | 3687-0358-7593-4682 | |
| E | Ellen Echo | ellenecho@gmail.com | 7854-8758-0356-6932 | |

FIG. 11

| Field | Searchable |
|---|---|
| Name | N |
| E-Mail Address | N |
| Credit Card Number | N |
| Title | Y |
| Identification | Y |
| Author | Y |
| Genre | Y |
| Available | Y |
| Twitter Handle | Y |

| Self-Help | | |
|---|---|---|
| Get It Together, Man! | A.J. Squaredaway | Self-Help |
| SH-7293 | | 2 |
| The Karma Apple Picker | Dharma Ohm | Self-Help |
| NewAge-73257 | | 7 |
| You're Fine Just the Way You Are | Harmony Song | Self-Help |
| 6835-7600-5498-3802 | | 11 |
| Stop Adult Bedwetting | Holden Itin | Self-Help |
| SH-7438 | @BillBravo | 13 |

FIG. 15

| Field | Searchable |
|---|---|
| Name | N |
| E-Mail Address | N |
| Credit Card Number | Y |
| Title | Y |
| Identification | Y |
| Author | Y |
| Genre | Y |
| Available | Y |
| Twitter Handle | N |

500

| Self-Help | | |
|---|---|---|
| Get It Together, Man! | A.J. Squaredaway | Self-Help |
| SH-7293 | 3687-0358-7593-4682 | 2 |
| The Karma Apple Picker | Dharma Ohm | Self-Help |
| NewAge-73257 | 9753-8600-1357-8754<br>7854-8758-0356-6932 | 7 |
| You're Fine Just the Way You Are | Harmony Song | Self-Help |
| 6835-7600-5498-3802 | 9753-8600-1357-8754 | 11 |
| Stop Adult Bedwetting | Holden Itin | Self-Help |
| SH-7438 | 6830-8563-9745-1268 | 13 |

| Self-Help | | |
|---|---|---|
| Get It Together, Man! | A.J. Squaredaway | Self-Help |
| SH-7293 | | 2 |
| The Karma Apple Picker | Dharma Ohm | Self-Help |
| NewAge-73257 | | 7 |
| You're Fine Just the Way You Are | Harmony Song | Self-Help |
| | | 11 |
| Stop Adult Bedwetting | Holden Itin | Self-Help |
| SH-7438 | | 13 |

1800

604

1802

US 11,520,924 B2

IDENTIFYING THAT AN ITEM OF INFORMATION POTENTIALLY INCLUDES AN ITEM OF SENSITIVE INFORMATION

BACKGROUND

A database can be an organized collection of items of information that can be stored in memory cells and that can be accessed through memory control circuitry controlled by a processor. A database management system can be software that can be operated by the processor so that applications and end users can interact with the memory cells of the database. The database management system can be configured so that the items of information stored in the memory cells can mimic, in interactions with the applications and the end users, being organized into one or more tables. A table can be a collection of items of information in which a set of one or more specific types of item of information related to one or more entities can be arranged. A specific type of item of information can be represented as a field (i.e., a column) in the table. An entity can be represented as a record (i.e., a row) in the table. The database management system can be configured to: (1) create a record to store items of information for an entity, (2) write values of items of information to one or more fields of a record, (3) read values of items of information from one or more fields of a record, and (4) delete a record.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIGS. 2 through 5 are diagrams illustrating examples of tables of a database of an end-user organization.

FIG. 6 is a diagram of an example of a user interface of an end-user-specific information management system.

FIG. 9 is a diagram illustrating an example of a Products table of the database.

FIG. 10 is a diagram of an example of the user interface of the end-user-specific information management system in which an item of sensitive information is erroneously included in a field correctly designated as searchable.

FIG. 11 is a diagram illustrating an example of a Customers table of the database.

FIG. 12 is a diagram illustrating an example of a Searchable table of the database.

FIG. 13 is a diagram of an example of the user interface of the end-user-specific information management system in which an item of sensitive information is correctly included in a field erroneously designated as searchable.

FIG. 15 is a diagram illustrating another example of the Searchable table of the database.

FIG. 16 is a diagram of another example of the user interface of the end-user-specific information management system in which an item of sensitive information is correctly included in a field erroneously designated as searchable.

FIG. 18 is a diagram of an example of a user interface of an end-user-specific information management system, according to the disclosed technologies.

DETAILED DESCRIPTION

Figure 1:
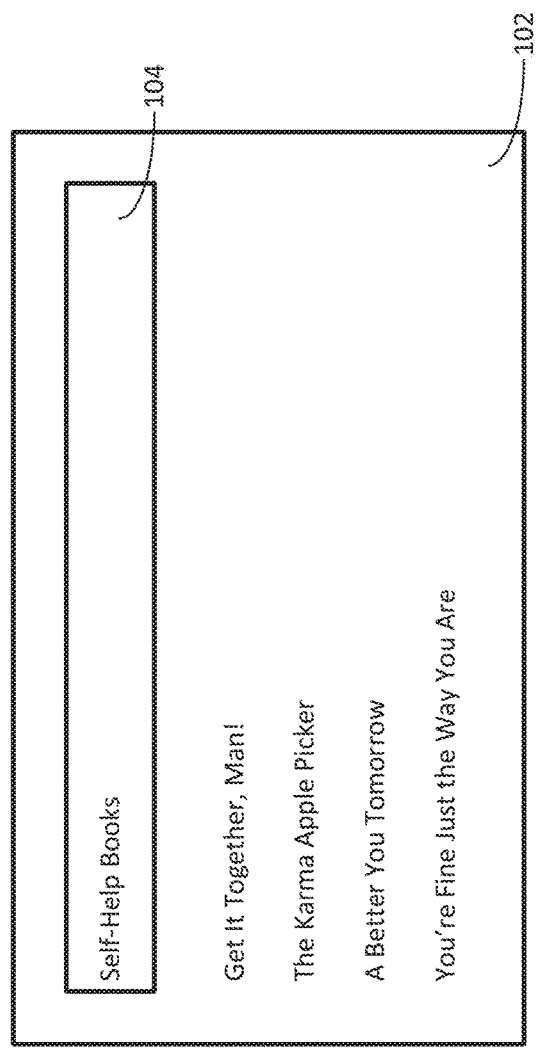
FIG. 1 is a diagram illustrating an example of a user interface of a general information retrieval system.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A database can be an organized collection of items of information that can be stored in memory cells and that can be accessed through memory control circuitry controlled by a processor. A database management system can be software that can be operated by the processor so that applications and end users can interact with the memory cells of the database. The database management system can be configured so that the items of information stored in the memory cells can mimic, in interactions with the applications and the end users, being organized into one or more tables. A table can be a collection of items of information in which a set of one or more specific types of items of information related to one or more entities can be arranged. A specific type of item of information can be represented as a field (i.e., a column) in the table. An entity can be represented as a record (i.e., a row) in the table. The database management system can be configured to: (1) create a record to store items of information for an entity, (2) write values of items of information to one or more fields of a record, (3) read values of items of information from one or more fields of a record, and (4) delete a record. A database can be used by an organization to support a variety of activities including, for example, maintaining administrative information and managing workflow.

The development of the Internet has allowed for computing resources to be distributed so that, for example, an instruction can be sent, via the Internet, from a first location to a second location. At the second location, computing resources can use the instruction to cause a function to be performed (using an application). A result of the function can be sent, via the Internet, from the second location to the first location. This, in turn, has led to the emergence of cloud computing in which items of information and applications, traditionally controlled by computing resources of an end-user organization (e.g., at the first location), can be controlled by computing resources of a third party cloud computing organization (e.g., at the second location). More recently, cloud computing organizations have developed multitenancy software architecture so that a single instance of an application operating on a computing resource (e.g., a server) of a cloud computing organization can perform the function of the application for multiple client organizations (e.g., tenants). Multitenancy software architecture can be configured so that a first tenant generally does not have access to proprietary items of information of a second tenant, and vice versa.

Items of information and applications traditionally controlled by computing resources of an end-user organization that are now often controlled by computing resources of a cloud computing organization can include a database of an end-user organization and a database management system. A database of an end-user organization and a database management system that are controlled in a multitenancy software architecture environment can be referred to as a multi-tenant database.

In a cloud computing environment, an information management system can be used so that an end-user organization, or a third party controlled by the end-user organization, can interact with the database management system to: (1) create a record to store items of information for an entity, (2) write values of items of information to one or more fields of a record, (3) read values of items of information from one or more fields of a record, or (4) delete a record. The items of information that are the subject of such an interaction can be proprietary items of information of the end-user organization. Additionally, the information management system can be used so that the end-user organization, or the third party controlled by the end-user organization, can change a manner in which the proprietary items of information of the end-user organization can be organized in the database.

The information management system can include, for example, an information retrieval system. An information retrieval system can be an electronic system configured to receive, from a user, a request that represents one or more characteristics of an informational need of the user. The information retrieval system can be configured to produce an interface configured to facilitate receipt of the request. The interface can include, for example, a text box into which the user can enter the request as a query. The information retrieval system can be configured to provide a response to the query. The response can include one or more items of information relevant to the informational need. The response can be presented on the interface. Frequently, the response can include a large number of items of information. For at least this reason, the information retrieval system usually can rank the items of information according to degrees of relevancy and can present the items of information according to their ranks.

FIG. 1 is a diagram illustrating an example of a user interface 102 of a general information retrieval system 100. The general information retrieval system 100 can be configured to interact with a public database. The public database can include a large number of items of information. (For example, the World Wide Web has over 4.7 billion pages.) The user interface 102 can include, for example, a text box 104 into which a user can enter, as a query, a request for items of information. For illustrative purposes herein, the request can be for Self-Help Books. The user interface 102 can be configured to present a response to the query. For illustrative purposes herein, the response can include four items of information, which are titles of self-help books: (1) "Get It Together, Man!", (2) "The Karma Apple Picker", (3) "A Better You Tomorrow", and (4) "You're Fine Just the Way You Are".

However, an information retrieval system configured to interact with a database of an end-user organization can be further configured to include, in a response to the query, items of information that are: (1) relevant to the informational need represented by the query and (2) in one or more fields, of one or more tables of the database, that are designated as searchable. The end-user organization can designate a field, of a table of the database, as unsearchable for a variety of reasons. For example, if items of information stored in a field include a sensitive information, then the end-user organization may designate the field as unsearchable.

The sensitive information can include, for example, one or more of a classified information, a confidential business information, a private information, a personal information, or the like. The classified information can be related to a security of a country. Information can be designated as classified, for example, by a national government. The confidential business information can be information that, if disclosed, could impair a value of a business. The private information can be information that can identify a person, while the personal information can be information related to the life of the person, but may not be useable to uniquely identify the person. The private information can include, for example, one or more of a personal identifiable information, a personal identifying information, a personally identifiable information, or a personally identifying information, or the like. The personal identifiable information, the personal identifying information, the personally identifiable information, and the personally identifying information can be referred to as PII.

For example, the sensitive information can include one or more of a name, a contact information (e.g., a mailing address, a telephone number, an e-mail address, a Twitter® handle, etc.), an account number for an account with a financial institution (e.g., a credit card number), or the like.

FIGS. 2 through 5 are diagrams illustrating examples of tables of a database of an end-user organization. For illustrative purposes herein, the end-user organization is a bookseller that sells books both online and in traditional bricks-and-mortar stores.

Figure 2:
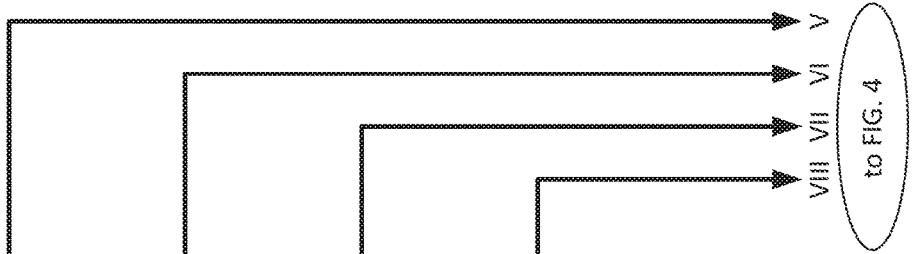

FIG. 2 is a diagram illustrating a first example of a Products table 200 of the database. The Product table 200 can include, for example, fields for: (1) "title", for a title of a corresponding book, (2) "identification", for an identification number used by a manufacturer of the corresponding book (or another organization) to identify the corresponding book, (3) "author", for an author of the corresponding book, (4) "genre", for a designation of a genre of the corresponding book, (5) "available", for a count of a number of copies of the corresponding book currently available for sale by the bookseller, and (6) "key", to link a record for the corresponding book to one or more other records in one or more other tables.

Figure 3:
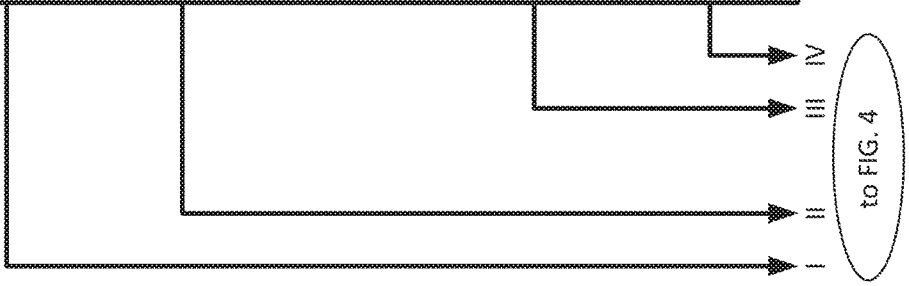

FIG. 3 is a diagram illustrating an example of a Customers table 300 of the database. The Customers table 300 can include, for example, fields for: (1) "key", to link a record for a corresponding customer to one or more other records in one or more other tables, (2) "name", for a name of the corresponding customer, (3) "e-mail address", for an e-mail address of the corresponding customer, and (4) "credit card number", for a credit card of the corresponding customer.

Figure 4:
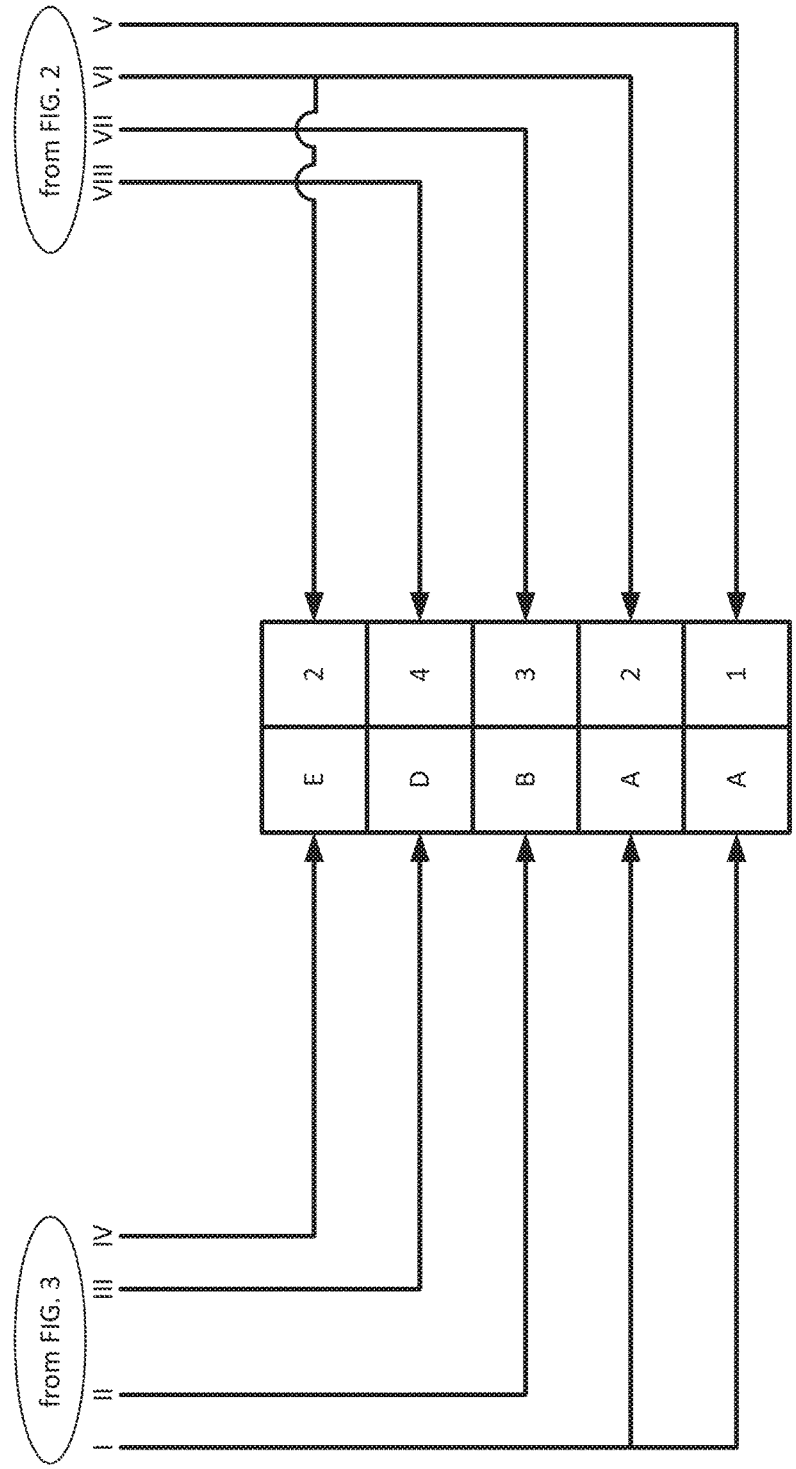

FIG. 4 is a diagram illustrating an example of a Sales table 400 of the database. The Sales table 400 can be a resolution table between the Products table 200 and the Customers table 300. The Sales table 400 can include, for example, records that indicate: (1) customer Ellen Echo (key E) purchased a copy of "The Karma Apple Picker" (key 2), (2) customer Dan Delta (key D) purchased a copy of "Get It Together, Man!" (key 4), (3) customer Bill Bravo (key B) purchased a copy of "Stop Adult Bedwetting" (key 3), (4) customer Anne Alpha (key A) purchased a copy of "The Karma Apple Picker" (key 2), and (5) customer Anne Alpha (key A) purchased a copy of "You're Fine Just the Way You Are" (key 1).

FIG. 5 is a diagram illustrating an example of a Searchable table 500 of the database. The Searchable table 500 can include, for example, records that indicate: (1) the "name" field is unsearchable, (2) the "e-mail address" field is unsearchable, (3) the "credit card number" field is unsearchable, (4) the "title" field is searchable, (5) the "identification" field is searchable, (6) the "author" field is searchable, (7) the "genre" field is searchable, and (8) the "available" field is searchable. For example, the bookseller (i.e., the end-user organization) can have determined that the items of information stored in the "name" field, the "e-mail address" field, and the "credit card number" field include sensitive information and, therefore, designated these fields as unsearchable.

FIG. 6 is a diagram of an example of a user interface 602 of an end-user-specific information management system 600. The end-user-specific information management system 600 can be configured to interact with the database of the bookseller (i.e., the end-user organization). The user interface 602 can include, for example, a text box 604 into which a user can enter, as a query, a request for items of information. For example, the request can be for Self-Help. The user interface 602 can be configured to present a response to the query. For example, the response can include four sets of items of information: (1) a first set for the book with the title "Get It Together, Man!" and including a corresponding identification number of "SH-7293", a corresponding author of "A. J. Squaredaway", a corresponding genre of "Self-Help", and a corresponding count of the number of copies of the book currently available for sale by the bookseller of "2", (2) a second set for the book with the title "The Karma Apple Picker" and including a corresponding identification number of "NewAge-73257", a corresponding author of "Dharma Ohm", a corresponding genre of "Self-Help", and a corresponding count of the number of copies of the book currently available for sale by the bookseller of "7", (3) a third set for the book with the title "You're Fine Just the Way You Are" and including a corresponding identification number of "6835-7600-5498-3802", a corresponding author of "Harmony Song", a corresponding genre of "Self-Help", and a corresponding count of the number of copies of the book currently available for sale by the bookseller of "11", and (4) a fourth set for the book with the title "Stop Adult Bedwetting" and including a corresponding identification number of "SH-7438", a corresponding author of "Holden Itin", a corresponding genre of "Self-Help", and a corresponding count of the number of copies of the book currently available for sale by the bookseller of "13".

With reference to FIGS. 2 through 5, FIG. 6 illustrates that the items of information presented by the user interface 602 of the end-user-specific information management system can include the items of information from the fields designated as searchable (e.g., "title", "identification", "author", "genre", and "available"), but can exclude items of information from the fields designated as unsearchable (e.g., "name", "e-mail address", and "credit card number").

However, as configured, such an end-user-specific information management system 600 does not prevent the user interface 602 from presenting an item of sensitive information that is at least: (1) erroneously included in a field correctly designated as searchable or (2) correctly included in a field erroneously designated as searchable.

The disclosed technologies address these deficiencies. The disclosed technologies provide a method for identifying that an item of information potentially includes an item of sensitive information. The item of information can be received in a response to a query of an end-user database. An existence of a characteristic associated with the item of information can be determined. The characteristic can be indicative that the item of information potentially includes the item of sensitive information. The characteristic can be different from being that a source of the item of information has been designated, via an information management system, as unsearchable. An action can be caused in response to a determination of the existence of the characteristic.

Figure 7:
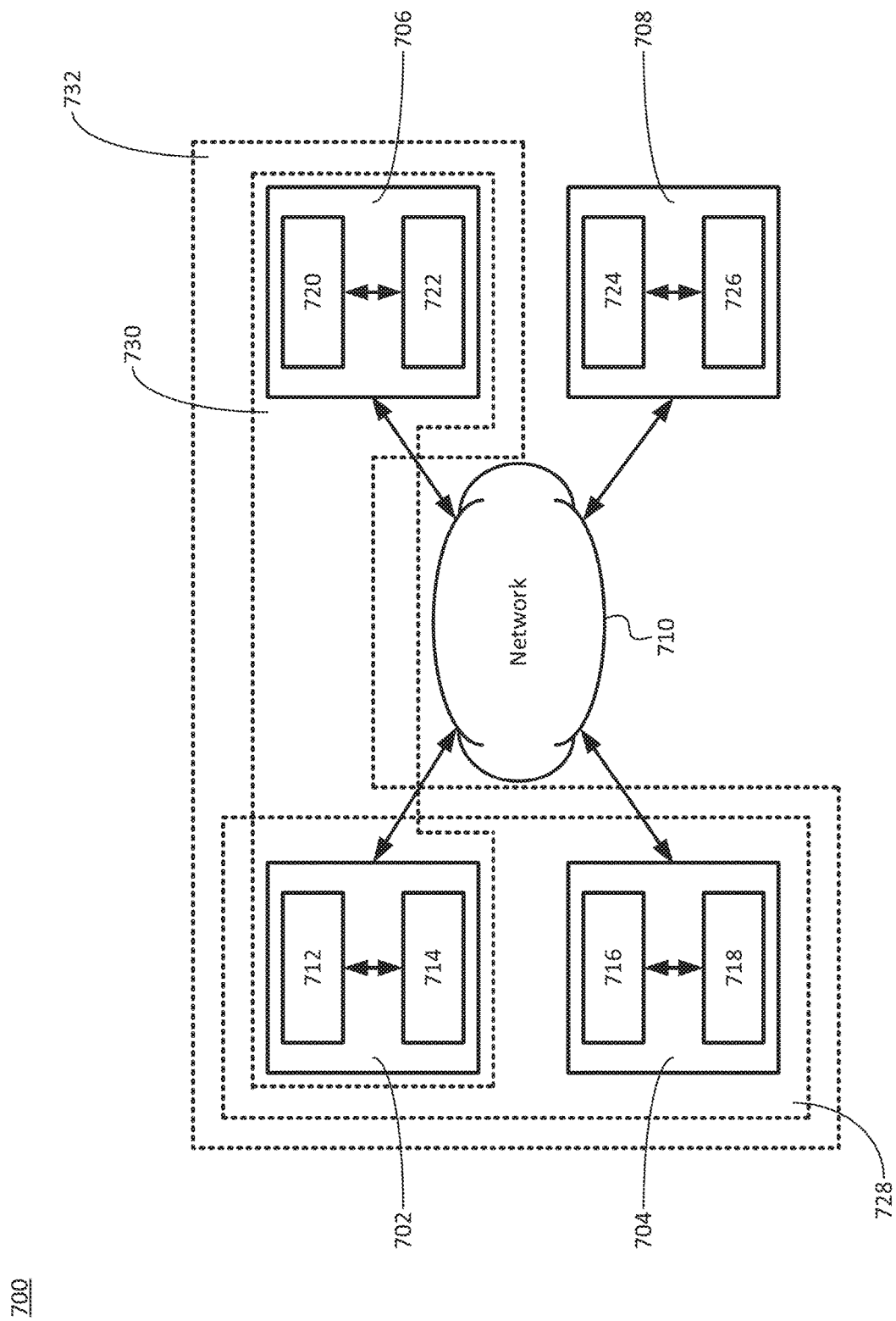
FIG. 7 is a diagram illustrating an example of an environment for identifying that an item of information potentially includes an item of sensitive information, according to the disclosed technologies.

FIG. 7 is a diagram illustrating an example of an environment 700 for identifying that an item of information potentially includes an item of sensitive information, according to the disclosed technologies. The environment 700 can include several elements such as, for example, computing resources 702 of a third party cloud computing organization, computing resources 704 of an end-user-specific information management system 704, and computing resources 706 of a system for identifying that the item of information potentially includes the item of sensitive information. In an implementation, the environment can also include computing resources 708 associated with an external database. In an implementation, an element of the environment 700 can communicatively connected to one or more other elements via a network 710.

The cloud computing resources 702 can include, for example, a processor 712 and a memory 714. The computing resources 702 can control, for example, an end-user database and a database management system. The end-user database and the database management system can be included, for example, in a multi-tenant database.

The computing resources 704 can include, for example, a processor 716 and a memory 718. The computing resources 704 can control, for example, the end-user-specific information management system. The end-user-specific information management system can include, for example, an end-user-specific information retrieval system. The end-user-specific information retrieval system can include, for example, a user interface.

The computing resources 706 can include, for example, a processor 720 and a memory 722.

The computing resources 708 can include, for example, a processor 724 and a memory 726.

In an implementation, the computing resources 702 and the computing resources 704 can be components of an overall system 728.

In an implementation, the computing resources 702 and the computing resources 706 can be components of an overall system 730.

In an implementation, the computing resources 702, the computing resources 704, and the computing resources 706 can be components of an overall system 732.

Figure 8:
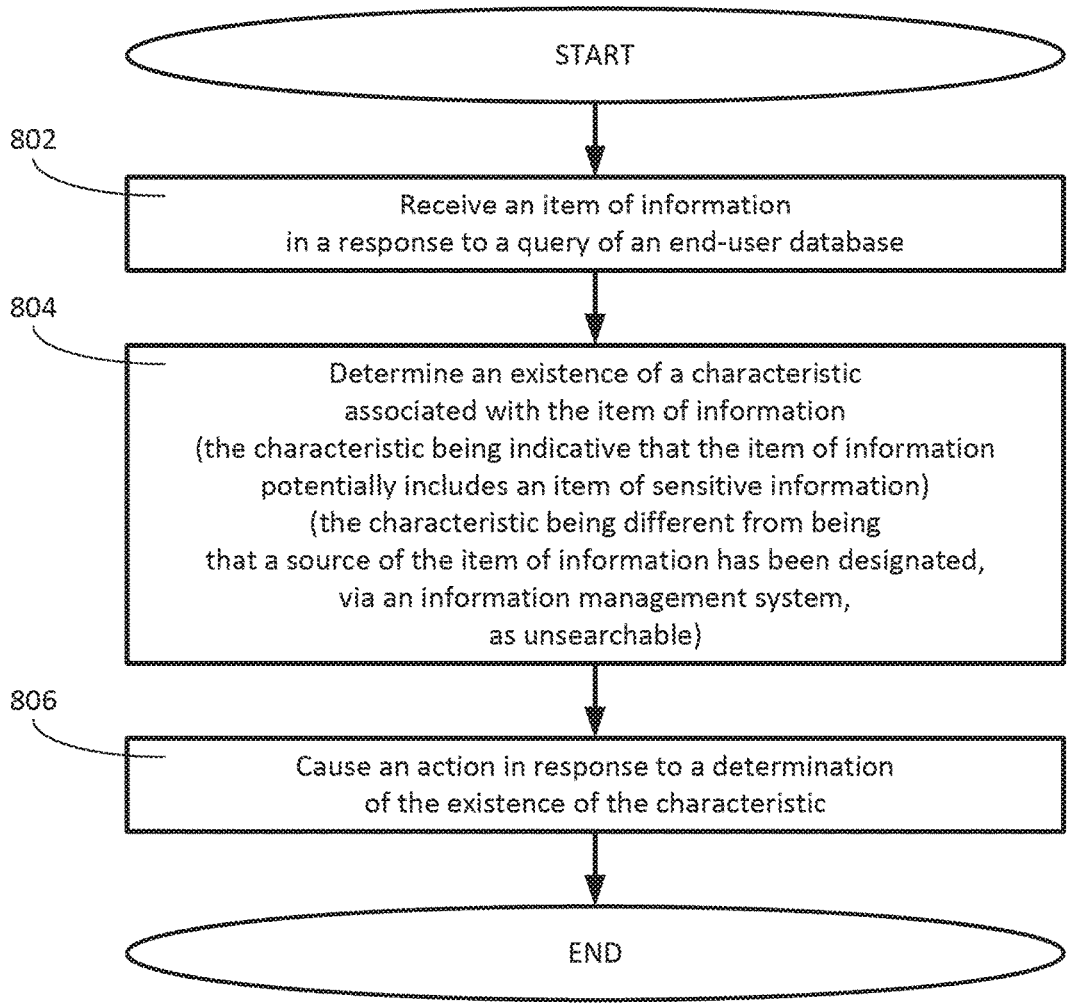
FIG. 8 is a flow diagram illustrating an example of a method for identifying that an item of information potentially includes an item of sensitive information, according to the disclosed technologies.

FIG. 8 is a flow diagram illustrating an example of a method 800 for identifying that an item of information potentially includes an item of sensitive information, according to the disclosed technologies.

The sensitive information can include, for example, one or more of a classified information, a confidential business information, a private information, a personal information, or the like. The classified information can be related to a security of a country. Information can be designated as classified, for example, by a national government. The confidential business information can be information that, if disclosed, could impair a value of a business. The private information can be information that can identify a person, while the personal information can be information related to the life of the person, but may not be useable to uniquely identify the person. The private information can include, for example, one or more of a personal identifiable information, a personal identifying information, a personally identifiable information, or a personally identifying information, or the like. The personal identifiable information, the personal identifying information, the personally identifiable information, and the personally identifying information can be referred to as PII.

For example, the sensitive information can include one or more of a name, a contact information (e.g., a mailing address, a telephone number, an e-mail address, a Twitter® handle, etc.), an account number for an account with a financial institution (e.g., a credit card number), or the like.

In the method 800, at an operation 802, a processor can receive the item of information in a response to a query of an end-user database.

At an operation 804, the processor can determine an existence of a characteristic associated with the item of information. The characteristic can be indicative that the item of information potentially includes the item of sensitive information. The characteristic can be different from being that a source of the item of information has been designated, via an information management system, as unsearchable.

In a first implementation, for example, the processor can determine the existence of the characteristic by comparing a format of the item of information with a format known to be used for an item of information that includes the item of sensitive information.

For example, with reference to FIG. 2, a format of a value "6835-7600-5498-3802" of the "identification" field for the record in which the "key" field has a value of "1" can be similar or identical to a format used for a credit card number (e.g., sixteen numerals or four groups each of four numerals with each group separated from an adjacent group by a dash). Because the format used for a credit card number is a format known to be used for an item of information that includes an item of sensitive information, with the disclosed technologies the processor can determine the existence of the characteristic based on the format of the value "6835-7600-5498-3802" being similar or identical to the format used for a credit card number.

In a second implementation, for example, the processor can determine the existence of the characteristic by determining that the item of information matches an item of information known to include the item of sensitive information. For example, the item of information known to include the item of sensitive information can be included in the end-user database.

FIG. 9 is a diagram illustrating a second example of the Products table 200 of the database. For example, a product manager at a store of the bookseller can be in the process of entering, via a user interface of the information management system, items of information for a new record in which the "key" field has a value of "5". The new record can be for a book with the title "How I Came Out of the Closet", a corresponding identification number of "NF8356-92557", a corresponding author of "Ellen DuGenerous", a corresponding genre of "Self-Help", and a corresponding count of the number of copies of the book currently available for sale by the bookseller of "9". In the process of entering these items of information, the product manager can be interrupted by Ellen Echo, a well-known customer at the store. Returning to the process of entering the items of information, the product manager can erroneously enter "Ellen Echo" in the "author" field of the new record.

FIG. 10 is a diagram of an example of the user interface 602 of the end-user-specific information management system 600 in which an item of sensitive information is erroneously included in a field correctly designated as searchable. For example, in an absence of the disclosed technologies, the user interface 602 can present, in the response to the query for Self-Help, four sets of information that includes a set for the book with the title "How I Came Out of the Closet" with a corresponding identification number of "NF8356-92557", a corresponding author of (erroneously) "Ellen Echo", a corresponding genre of "Self-Help", and a corresponding count of the number of copies of the book currently available for sale by the bookseller of "9".

With reference to FIGS. 3, 5, and 9, because: (1) a value of "Ellen Echo" of the "author" field for the record in which the "key" field has the value of "5" in the Products table 200 (FIG. 9) matches a value of "Ellen Echo" of the "name" field for the record in which the "key" field has a value of "E" in the Customers table 300 (FIG. 3) and (2) the "name" field is unsearchable (FIG. 5), with the disclosed technologies the processor can determine the existence of the characteristic based on the value "Ellen Echo" of the "author" field being a match with the value "Ellen Echo" of the "name" field.

FIG. 11 is a diagram illustrating a second example of the Customers table 300 of the database. For example, a database manager of the bookseller can be in the process of changing, via the information management system, a manner in which items of information are organized in the end-user database. Specifically, the database manager can be in the process of adding, to the Customers table 300, a field for "Twitter handle", for a user name for an account, for a corresponding customer, for a social media service provided by Twitter, Inc. of San Francisco, Calif. The database manager can also enter a value of "@BillBravo" in the "Twitter handle" field for the record in which the "key" field has the value of "B" in the Customers table 300.

FIG. 12 is a diagram illustrating a second example of the Searchable table 500 of the database. For example, the database manager can also erroneously designate the "Twitter handle" field as searchable.

FIG. 13 is a diagram of a first example of the user interface 602 of the end-user-specific information management system 600 in which an item of sensitive information is correctly included in a field erroneously designated as searchable. For example, in an absence of the disclosed technologies, the user interface 602 can present, in the response to the query for Self-Help, four sets of information in which the fourth set for the book with the title "Stop Adult Bedwetting" erroneously includes a corresponding Twitter handle of "@BillBravo" because, with reference to FIGS. 2, 4, 11, and 12: (1) "Stop Adult Bedwetting" is the value of the "title" field for the record in the Products table 200 in which the "key" field has the value "3" (FIG. 2), (2) a record in the Sales table 400 indicates that the product included in the record of the Products table 200 in which the "key" field has the value "3" was purchased by the customer included in the Customers table 300 in which the "key" field has the value "B" (FIG. 4), (3) "@BillBravo" is the value of the "Twitter handle" field for the record in the Customers table 300 in which the "key" field has the value "B" (FIG. 11), and (4) the "Twitter handle" field is searchable (FIG. 12).

Figure 14:
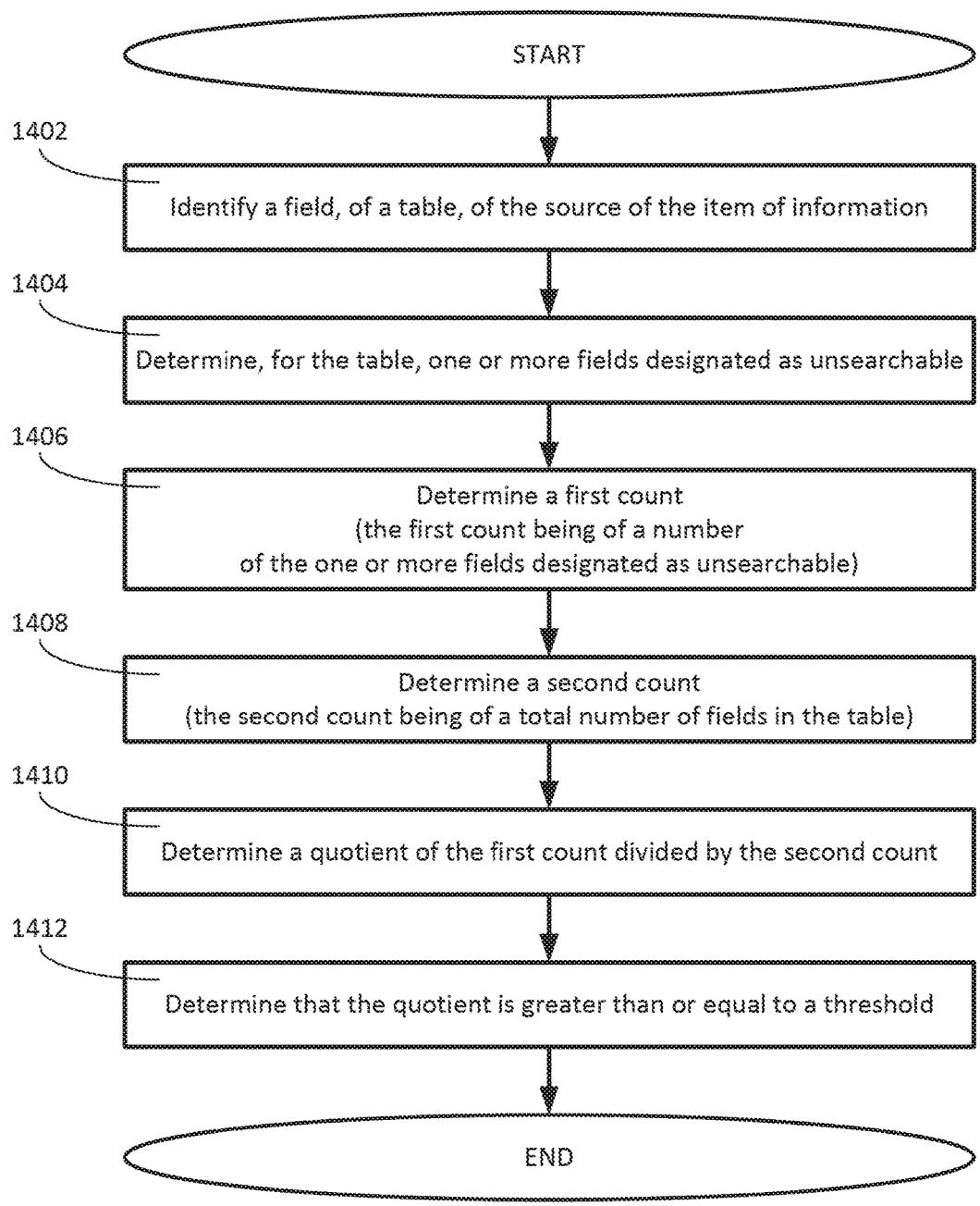
FIG. 14 is a flow diagram illustrating an example of a method for an implementation for determining an existence of a characteristic indicative that the item of information potentially includes the item of sensitive information, according to the disclosed technologies.

FIG. 14 is a flow diagram illustrating an example of a method 1400 for a third implementation for determining the existence of the characteristic.

In the method 1400, at an operation 1402, the processor can identify a field, of a table, of the source of the item of information. For example, with reference to FIG. 11, if the item of information is the value "@BillBravo", then the field, of the table, of the source of the item of information can be the "Twitter handle" field of the Customers table 300.

Returning to FIG. 14, at an operation 1404, the processor can determine, for the table, one or more fields designated as unsearchable. For example, with reference to FIGS. 11 and 12, the "name" field, the "e-mail address" field, and the "credit card number" field are designated as unsearchable.

Returning to FIG. 14, at an operation 1406, the processor can determine a first count. The first count can be of a number of the one or more fields designated as unsearchable. For example, with reference to FIGS. 11 and 12, the first count can be three.

Returning to FIG. 14, at an operation 1408, the processor can determine a second count. The second count can be of a total number of fields in the table. For example, with reference to FIG. 11, the second count can be five.

Returning to FIG. 14, at an operation 1410, the processor can determine a quotient of the first count divided by the second count. For example, the quotient can be three divided by five: 0.6.

At an operation 1412, the processor can determine that the quotient is greater than or equal to a threshold. For example, if the threshold is 0.5, then the quotient (0.6) is greater than the threshold (0.5).

With the disclosed technologies the processor can determine that the source of the item of information is a table in which a ratio of unsearchable fields to total fields is greater than or equal to a threshold, which can be indicative that the item of information potentially includes an item of sensitive information.

In a fourth implementation, for example, the processor can determine the existence of the characteristic by determining that the item of information matches an item of information known to include the item of sensitive information. For example, the item of information known to include the item of sensitive information can be received from another database. For example, the item of information known to include the item of sensitive information can be an item of information known to be associated with a previous breach of security of the sensitive information.

FIG. 15 is a diagram illustrating a third example of the Searchable table 500 of the database. For example, the database manager can have corrected the designation of the "Twitter handle" field so that it is unsearchable, but erroneously designated the "credit card number" field as searchable.

FIG. 16 is a diagram of a second example of the user interface 602 of the end-user-specific information management system 600 in which an item of sensitive information is correctly included in a field erroneously designated as searchable. For example, in an absence of the disclosed technologies, the user interface 602 can present, in the response to the query for Self-Help, four sets of information in which: (1) the first set for the book with the title "Get It Together, Man!" erroneously includes a corresponding credit card number of "3687-0358-7593-4682" (which corresponds to "Dan Delta"), (2) the second set for the book with the title "The Karma Apple Picker" erroneously includes corresponding credit card numbers of "9753-8600-1357-8754" (which corresponds to "Anne Alpha") and "7854-8758-0356-6932" (which corresponds to "Ellen Echo"), (3) the third set for the book with the title "You're Fine Just the Way You Are" erroneously includes a corresponding credit card number of "9753-8600-1357-8754" (which corresponds to "Anne Alpha"), and (4) the fourth set for the book with the title "Stop Adult Bedwetting" erroneously includes a corresponding credit card number of "6830-8563-9745-1268" (which corresponds to "Bill Bravo").

However, with the disclosed technologies the processor can receive, from another database (e.g., the external database associated with the computing resources 708 illustrated in FIG. 7), the item of information known to include the item of sensitive information. For example, the item of information known to include the item of sensitive information can be an item of information known to be associated with a previous breach of security of the sensitive information. For example, the other database can be a database of credit card numbers known to be associated with previous breaches of security.

For example, if: (1) the item of information is "3687-0358-7593-4682" and (2) the item of information known to include the item of sensitive information, received from the other database, is "3687-0358-7593-4682", then with the disclosed technologies the processor can determine the existence of the characteristic based on the match.

Returning to FIG. 8, at an operation 806, the processor can cause an action in response to a determination of the existence of the characteristic.

Figure 17A:
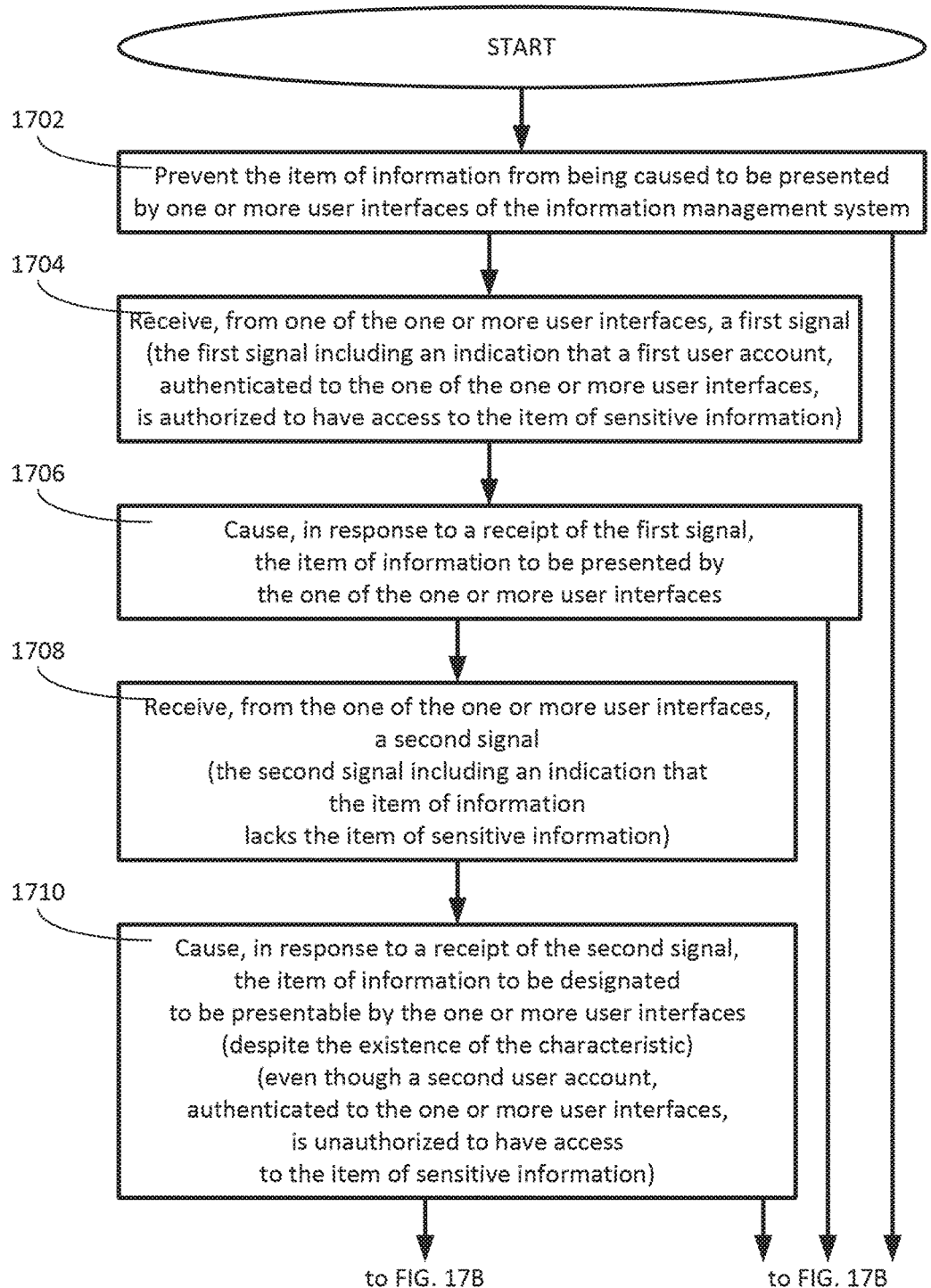
FIGS. 17A and 17B are a flow diagram illustrating an example of a method for a first implementation for causing an action in response to a determination of the existence of the characteristic.
Figure 17B:
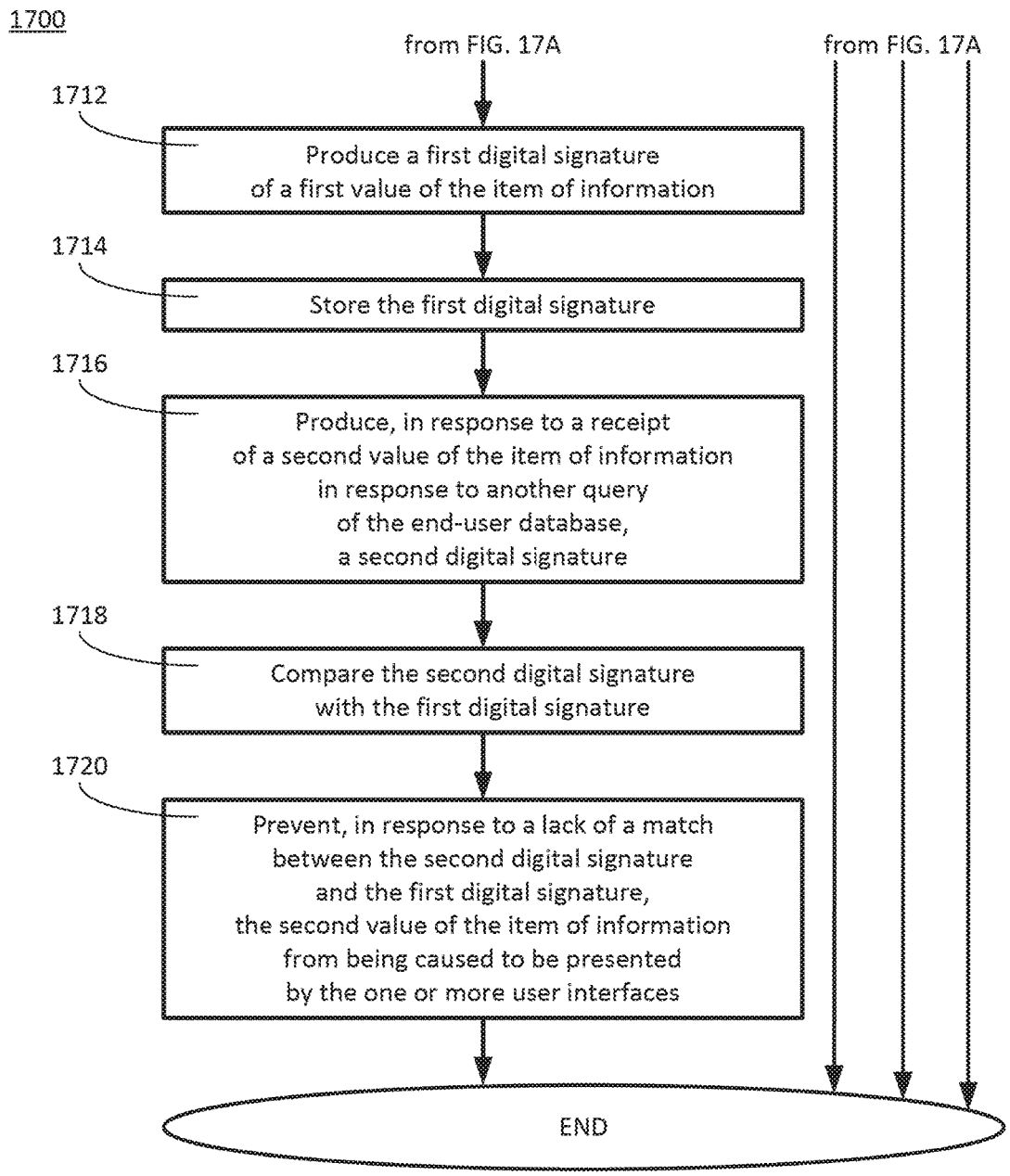

FIGS. 17A and 17B are a flow diagram illustrating an example of a method 1700 for a first implementation for causing the action in response to the determination of the existence of the characteristic.

With reference to FIG. 17A, in the method 1700, at an operation 1702, the processor can prevent the item of information from being caused to be presented by one or more user interfaces of the information management system. For example, with reference to FIG. 2, a format of a value "6835-7600-5498-3802" of the "identification" field for the record in which the "key" field has a value of "1" can be similar or identical to a format used for a credit card number (e.g., sixteen numerals or four groups each of four numerals with each group separated from an adjacent group by a dash). Because the format used for a credit card number is a format known to be used for an item of information that includes an item of sensitive information, with the disclosed technologies the processor can determine the existence of the characteristic based on the format of the value "6835-7600-5498-3802" being similar or identical to the format used for a credit card number. Accordingly, the processor can prevent the item of information from being caused to be presented by the one or more user interfaces of the information management system.

FIG. 18 is a diagram of an example of a user interface 1802 of an end-user-specific information management system 1800, according to the disclosed technologies. For example, with the disclosed technologies, the user interface 1802 can present, in the response to the query for Self-Help, four sets of information in which the third set for the book with the title "You're Fine Just the Way You Are" excludes a corresponding identification number because the format of the identification number is similar or identical to the format used for a credit card number.

Returning to FIG. 17A, in an implementation, at an operation 1704, the processor can receive, from one of the one or more user interfaces, a first signal. The first signal can include an indication that a first user account, authenticated to the one of the one or more user interfaces, is authorized to have access to the item of sensitive information. For example, the first user account can be associated with an employee of the bookseller authorized to have access to credit card numbers of customers. For example, in response to a lack of a corresponding identification number in the presentation of the third set for the book with the title "You're Fine Just the Way You Are", the employee may decide to investigate the underlying reason and cause the first signal to be sent to the processor.

At an operation 1706, the processor can cause, in response to a receipt of the first signal, the item of information to be presented by the one of the one or more user interfaces. For example, the value "6835-7600-5498-3802" of the identification number for the book with the title "You're Fine Just the Way You Are" can be presented on a user interface of the employee authorized to have access to credit card numbers of customers.

In an implementation, at an operation 1708, the processor can receive, from the one of the one or more user interfaces, a second signal. The second signal can include an indication that the item of information lacks the item of sensitive information. For example, the employee can review the format of the value "6835-7600-5498-3802" of the identification number for the book with the title "You're Fine Just the Way You Are" and determine that, although this format is identical to a format used for a credit card number, the value "6835-7600-5498-3802" is the correct value of the identification number for the book with the title "You're Fine Just the Way You Are".

At an operation 1710, the processor can cause, in response to a receipt of the second signal, the item of information to be designated to be presentable by the one or more user interfaces: (1) despite the existence of the characteristic and (2) even though a second user account, authenticated to the one or more user interfaces, is unauthorized to have access to the item of sensitive information.

With reference to FIG. 17B, in the method 1700, in an implementation, at an operation 1712, the processor can produce a first digital signature of a first value of the item of information. The first digital signature can be a function of the first value, can be unique for the first value, and can encrypt the first value. For example, the processor can produce a digital signature for the value "6835-7600-5498-3802".

At an operation 1714, the processor can store the first digital signature.

At an operation 1716, the processor can produce, in response to a receipt of a second value of the item of information in response to another query of the end-user database, a second digital signature. The second digital signature can be a function of the second value, can be unique for the second value, and can encrypt the second value. For example, a response to another query of the end-user database for Self-Help can include four sets of information in which the third set for the book with the title "You're Fine Just the Way You Are" includes a corresponding identification number with a value of "9753-8600-1357-8754" (i.e., the credit card number that corresponds to "Anne Alpha"). The processor can produce a digital signature for the value "9753-8600-1357-8754".

At an operation 1718, the processor can compare the second digital signature with the first digital signature.

At an operation 1720, the processor can prevent, in response to a lack of a match between the second digital signature and the first digital signature, the second value of the item of information from being caused to be presented by the one or more user interfaces.

Figure 19A:
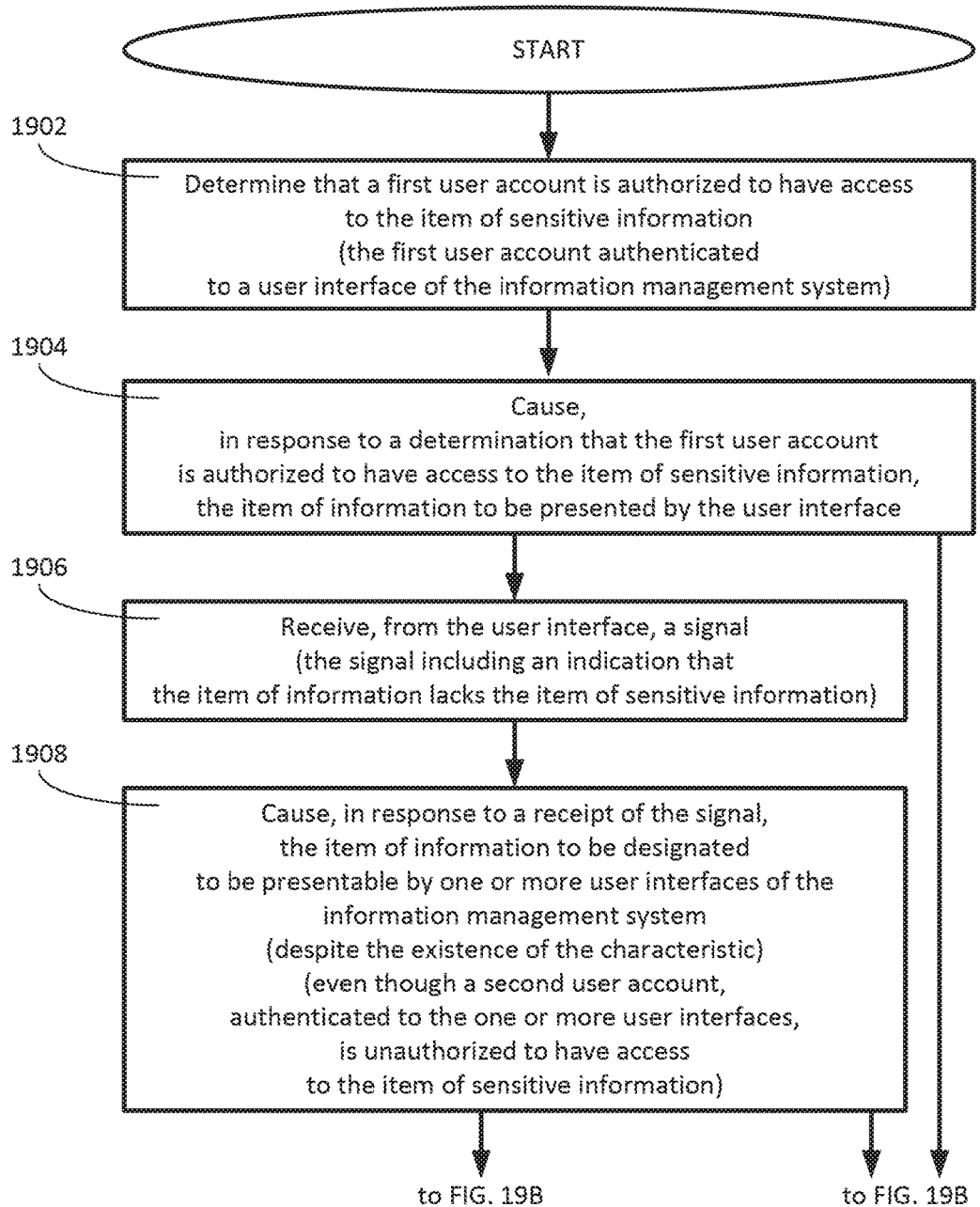
FIGS. 19A and 19B are a flow diagram illustrating an example of a method for a second implementation for causing the action in response to the determination of the existence of the characteristic.
Figure 19B:
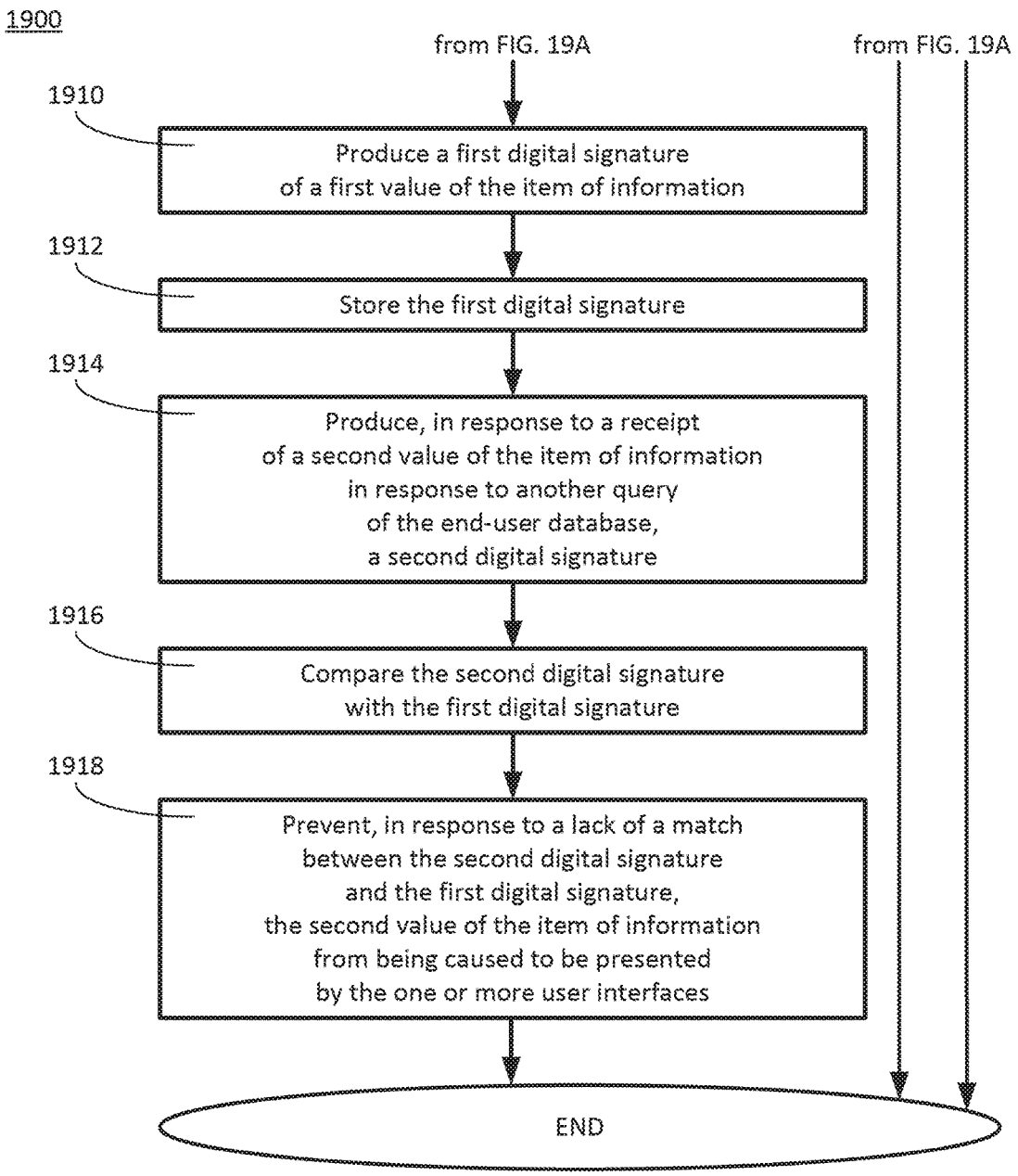

FIGS. 19A and 19B are a flow diagram illustrating an example of a method 1900 for a second implementation for causing the action in response to the determination of the existence of the characteristic.

With reference to FIG. 19A, in the method 1900, at an operation 1902, the processor can determine that a first user account is authorized to have access to the item of sensitive information. The first user account can be authenticated to a user interface of the information management system. For example, the first user account can be associated with an employee of the bookseller authorized to have access to items of sensitive information.

At an operation 1904, the processor can cause, in response to a determination that the first user account is authorized to have access to the item of sensitive information, the item of information to be presented by the user interface. For example, the value "6835-7600-5498-3802" of the identification number for the book with the title "You're Fine Just the Way You Are" can be presented on a user interface of the employee authorized to have access to credit card numbers of customers.

In an implementation, at an operation 1906, the processor can receive, from the user interface, a signal. The signal can include an indication that the item of information lacks the item of sensitive information. For example, the employee can review the format of the value "6835-7600-5498-3802" of the identification number for the book with the title "You're Fine Just the Way You Are" and determine that, although this format is identical to a format used for a credit card number, the value "6835-7600-5498-3802" is the correct value of the identification number for the book with the title "You're Fine Just the Way You Are".

At an operation 1908, the processor can cause, in response to a receipt of the signal, the item of information to be designated to be presentable by one or more user devices of the information management system: (1) despite the existence of the characteristic and (2) even though a second user account, authenticated to the one or more user interfaces, is unauthorized to have access to the item of sensitive information.

With reference to FIG. 19B, in the method 1900, in an implementation, at an operation 1910, the processor can produce a first digital signature of a first value of the item of information. The first digital signature can be a function of the first value, can be unique for the first value, and can encrypt the first value. For example, the processor can produce a digital signature for the value "6835-7600-5498-3802".

At an operation 1912, the processor can store the first digital signature.

At an operation 1914, the processor can produce, in response to a receipt of a second value of the item of information in response to another query of the end-user database, a second digital signature. The second digital signature can be a function of the second value, can be unique for the second value, and can encrypt the second value. For example, a response to another query of the end-user database for Self-Help can include four sets of information in which the third set for the book with the title "You're Fine Just the Way You Are" includes a corresponding identification number with a value of "9753-8600-1357-8754" (i.e., the credit card number that corresponds to "Anne Alpha"). The processor can produce a digital signature for the value "9753-8600-1357-8754".

At an operation 1916, the processor can compare the second digital signature with the first digital signature.

At an operation 1918, the processor can prevent, in response to a lack of a match between the second digital signature and the first digital signature, the second value of the item of information from being caused to be presented by the one or more user interfaces.

In light of the technologies described above, one of skill in the art understands that operations to determine that an item of confidential information has been removed from a record can be performed using any combination of some or all of the foregoing configurations.

Figure 20:
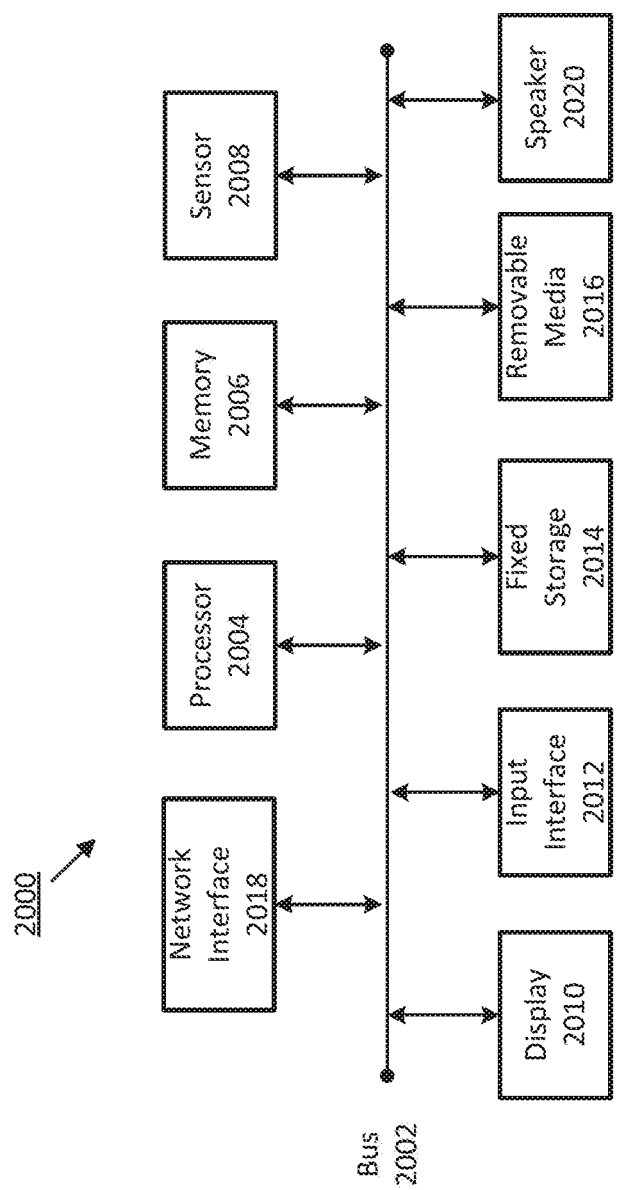
FIG. 20 is a block diagram of an example of a computing device suitable for implementing certain devices, according to the disclosed technologies.

FIG. 20 is a block diagram of an example of a computing device 2000 suitable for implementing certain devices, according to the disclosed technologies including, for example, one or more of the computing resources 702, the computing resources 704, the computing resources 706, or the computing resources 708. The computing device 2000 can be constructed as a custom-designed device or can be, for example, a special-purpose desktop computer, laptop computer, or mobile computing device such as a smart phone, tablet, personal data assistant, wearable technology, or the like.

The computing device 2000 can include a bus 2002 that interconnects major components of the computing device 2000. Such components can include a central processor 2004, a memory 2006 (such as Random Access Memory (RAM), Read-Only Memory (ROM), flash RAM, or the like), a sensor 2008 (which can include one or more sensors), a display 2010 (such as a display screen), an input interface 2012 (which can include one or more input devices such as a keyboard, mouse, keypad, touch pad, turn-wheel, and the like), a fixed storage 2014 (such as a hard drive, flash storage, and the like), a removable media component 2016 (operable to control and receive a solid-state memory device, an optical disk, a flash drive, and the like), a network interface 2018 (operable to communicate with one or more remote devices via a suitable network connection), and a speaker 2020 (to output an audible communication). In some embodiments the input interface 2012 and the display 2010 can be combined, such as in the form of a touch screen.

The bus 2002 can allow data communication between the central processor 2004 and one or more memory components 2014, 2016, which can include RAM, ROM, or other memory. Applications resident with the computing device 2000 generally can be stored on and accessed via a computer readable storage medium.

The fixed storage 2014 can be integral with the computing device 2000 or can be separate and accessed through other interfaces. The network interface 2018 can provide a direct connection to the premises management system and/or a remote server via a wired or wireless connection. The network interface 2018 can provide such connection using any suitable technique and protocol, including digital cellular telephone, WiFi™, Thread®, Bluetooth®, near field communications (NFC), and the like. For example, the network interface 2018 can allow the computing device 2000 to communicate with other components of the premises management system or other computers via one or more local, wide-area, or other communication networks.

The foregoing description, for purpose of explanation, has been described with reference to specific configurations. However, the illustrative descriptions above are not intended to be exhaustive or to limit configurations of the disclosed technologies to the precise forms disclosed. Many modifications and variations are possible in view of the above teachings. The configurations were chosen and described in order to explain the principles of configurations of the disclosed technologies and their practical applications, to thereby enable others skilled in the art to utilize those configurations as well as various configurations with various modifications as may be suited to the particular use contemplated.

The invention claimed is:

1. A method comprising:
receiving, by a processor, an item of information in response to a query to an end-user database;
determining, by the processor, that the item of information potentially includes an item of sensitive information by analyzing a source, in the end-user database, of the item of information with respect to an organization of items of information in the end-user database, where a ratio of unsearchable fields of the item of information to a total number of fields of the item of information is one of greater than or equal to a predetermined threshold; and
preventing or allowing, by the processor and based on determining whether a first user account is authorized to have access to the item of sensitive information, a presentation of the item of sensitive information.

2. The method of claim 1, wherein the item of sensitive information includes at least one of a classified information, a confidential business information, a personal information, or a private information.

3. The method of claim 2, wherein the private information includes at least one of a personal identifiable information, a personal identifying information, a personally identifiable information, or a personally identifying information.

4. The method of claim 1, wherein the item of sensitive information includes at least one of a name, a contact information, or an account number for an account with a financial institution.

5. The method of claim 1, wherein the item of information known to include the item of sensitive information is an item of information known to be associated with a previous breach of security of the sensitive information.

6. The method of claim 1, wherein the analyzing the source of the item of information with respect to the organization of the items of information in the end-user database comprises:
identifying a field, of a table, as the source of the item of information;
determining, for the table, at least one field designated as unsearchable;
determining a first count, the first count being of a number of the at least one field designated as unsearchable;
determining a second count, the second count being of a total number of fields in the table;
determining a quotient of the first count divided by the second count; and
determining that the quotient is greater than or equal to a threshold.

7. The method of claim 1, wherein the preventing or allowing the presentation of the item of sensitive information further comprises preventing the item of information from being presented by at least one user interface of an information management system.

8. The method of claim 7, further comprises:
receiving, from one of the at least one user interface, a first signal, the first signal including an indication that a first user account, authenticated to the one of the at least one user interface, is authorized to have access to the item of sensitive information; and causing, in response to a receipt of the first signal, the item of information to be presented by the one of the at least one user interface.

9. The method of claim 8, further comprises:

receiving, from the one of the at least one user interface, a second signal, the second signal including an indication that the item of information lacks the item of sensitive information; and causing, in response to a receipt of the second signal, the item of information to be designated to be presentable by the at least one user device:

despite the inclusion of the item of sensitive information; and even though a second user account, authenticated to the at least one user interface, is unauthorized to have access to the item of sensitive information.

10. The method of claim 9, further comprises:

producing a first digital signature of a first value of the item of information;

storing the first digital signature;

producing, in response to a receipt of a second value of the item of information in response to another query of the end-user database, a second digital signature;

comparing the second digital signature with the first digital signature; and preventing, in response to a lack of a match between the second digital signature and the first digital signature, the second value of the item of information from being caused to be presented by the at least one user interface.

11. The method of claim 1, wherein the first user account is authenticated to a user interface of an information management system, the method further comprising causing, in response to a determination that the first user account is authorized to have access to the item of sensitive information, the item of information to be presented by the user interface.

12. The method of claim 11, further comprises:

receiving, from the user interface, a signal, the signal including an indication that the item of information lacks the item of sensitive information; and causing, in response to a receipt of the signal, the item of information to be designated to be presentable by at least one user device of the information management system:

despite the inclusion of the item of sensitive information; and even though a second user account, authenticated to the at least one user interface, is unauthorized to have access to the item of sensitive information.

13. The method of claim 12, further comprises:

producing a first digital signature of a first value of the item of information;

storing the first digital signature;

producing, in response to a receipt of a second value of the item of information in response to another query of the end-user database, a second digital signature;

comparing the second digital signature with the first digital signature; and preventing, in response to a lack of a match between the second digital signature and the first digital signature, the second value of the item of information from being caused to be presented by the at least one user interface.

14. A non-transitory computer-readable medium storing computer code including instructions to cause a processor to:

receive an item of information in response to a query of an end-user database;

determine an existence of an item of sensitive information associated with an item of information by analyzing a source, in the end-user database, of the item of information with respect to an organization of items of information in the end-user database, where a ratio of unsearchable fields of the item of information to a total number of fields of the item of information is one of greater than or equal to a predetermined threshold; and prevent or allow, based on determining whether a first user account is authorized to have access to the item of sensitive information, a presentation of the item of sensitive information.

15. A system comprising:

a memory configured to store an item of information; and a processor configured to:

receive the item of information in response to a query of an end-user database;

determine an existence of an item of sensitive information associated with the item of information by analyzing a source, in the end-user database, of the item of information with respect to an organization of items of information in the end-user database, where a ratio of unsearchable fields of the item of information to a total number of fields of the item of information is one of greater than or equal to a predetermined threshold; and prevent or allow, based on determining whether a first user account is authorized to have access to the item of sensitive information, a presentation of the item of sensitive information.

16. The system of claim 15, wherein the end-user database is included in a multi-tenant database.

17. The system of claim 15, wherein the second database is external of the system.

18. The system of claim 15, wherein the end-user database and an information management system are components of an overall system.

19. The system of claim 15, wherein the end-user database and the system for identifying that the item of information potentially includes the item of sensitive information are components of an overall system.

* * * * *